US010670279B2

(12) United States Patent
Kinoshita et al.

(10) Patent No.: US 10,670,279 B2
(45) Date of Patent: Jun. 2, 2020

(54) FLOW RATE REGULATION APPARATUS AND HOT WATER APPARATUS

(71) Applicant: NORITZ CORPORATION, Hyogo (JP)

(72) Inventors: Ryota Kinoshita, Akashi (JP); Naoto Kobari, Hyogo (JP); Tadashi Takewaka, Kobe (JP); Koji Yamauchi, Akashi (JP)

(73) Assignee: NORITZ CORPORATION, Hyogo (JP)

( * ) Notice: Subject to any disclaimer, the term of this patent is extended or adjusted under 35 U.S.C. 154(b) by 156 days.

(21) Appl. No.: 15/813,642

(22) Filed: Nov. 15, 2017

(65) Prior Publication Data
US 2018/0149372 A1    May 31, 2018

(30) Foreign Application Priority Data

Nov. 29, 2016   (JP) ................................. 2016-231166
Apr. 18, 2017   (JP) ................................. 2017-082164

(51) Int. Cl.
*F16K 1/12*          (2006.01)
*F24D 19/10*         (2006.01)
(Continued)

(52) U.S. Cl.
CPC ............ *F24D 19/1051* (2013.01); *F16K 1/12* (2013.01); *F16K 11/22* (2013.01); *F16K 41/04* (2013.01); *F16K 31/055* (2013.01)

(58) Field of Classification Search
None
See application file for complete search history.

(56) References Cited

U.S. PATENT DOCUMENTS 3,330,294 A * 7/1967 Manning ................... F16K 3/26
                                              137/315.11
3,910,553 A * 10/1975 Boylan ..................... F16K 1/38
                                              251/205
(Continued)

FOREIGN PATENT DOCUMENTS

CN         86205714 U     3/1987
CN         87204007 U     1/1988
(Continued)

OTHER PUBLICATIONS

An Office Action mailed by the State Intellectual Property Office of the People's Republic of China dated Mar. 20, 2020, which corresponds to Chinese Patent Application No. 201711138193.7 and is related to U.S. Appl. No. 15/813,642; with English language translation.

*Primary Examiner* — John Fox
(74) *Attorney, Agent, or Firm* — Studebaker & Brackett PC

(57) ABSTRACT

A flow rate regulation apparatus according to one embodiment includes a main body portion including an incoming water flow path, a collar portion arranged in the main body portion and provided with a first through hole along a direction of extension of the incoming water flow path, and a valve shaft made of a resin and inserted in the first through hole, the valve shaft including a first large-diameter portion, a second large-diameter portion, and a first small-diameter portion lying between the first large-diameter portion and the second large-diameter portion and being smaller in outer diameter than the first large-diameter portion and the second large-diameter portion.

12 Claims, 10 Drawing Sheets

(51) Int. Cl.
  *F16K 41/04*   (2006.01)
  *F16K 11/22*   (2006.01)
  F16K 31/05    (2006.01)

(56) References Cited

U.S. PATENT DOCUMENTS

| | | | | |
|---|---|---|---|---|
| 4,188,699 | A | * | 2/1980 | Young ............... F16J 15/32 |
| | | | | 264/249 |
| 4,426,093 | A | * | 1/1984 | Roush ............... F16K 41/04 |
| | | | | 251/214 |
| 4,917,355 | A | * | 4/1990 | Dark ................ F16K 1/08 |
| | | | | 251/214 |
| 2002/0033465 | A1 | | 3/2002 | Mori et al. |
| 2003/0030020 | A1 | * | 2/2003 | Fukano ............. F16K 31/06 |
| | | | | 251/129.17 |
| 2010/0065763 | A1 | | 3/2010 | Suetome et al. |
| 2016/0169396 | A1 | * | 6/2016 | Ishikawa ........... F16K 41/103 |
| | | | | 251/213 |

FOREIGN PATENT DOCUMENTS

| | | | |
|---|---|---|---|
| CN | 2118213 | U | 10/1992 |
| CN | 1344872 | A | 4/2002 |
| CN | 101668971 | A | 3/2010 |
| JP | 2016-23906 | A | 2/2016 |

\* cited by examiner

FLOW RATE REGULATION APPARATUS AND HOT WATER APPARATUS

BACKGROUND OF THE INVENTION

Field of the Invention

The present invention relates to a flow rate regulation apparatus and a hot water apparatus including the same.

Description of the Background Art

A valve apparatus described, for example, in Japanese Patent Laying-Open No. 2016-23906 has been known as a conventional flow rate regulation apparatus. The valve apparatus described in patent document 1 has a valve housing, a valve shaft, a motor, and a valve disc.

The valve housing includes a hot water supply path, a hot water egress path, and a hot water filling path. The hot water egress path and the hot water filling path are branched from the hot water supply path in the valve housing. The valve housing includes a valve seat provided in the hot water supply path. The valve disc is attached to the valve shaft as being opposed to the valve seat. The valve shaft is attached to the motor. The motor moves the valve shaft. A distance between the valve seat and the valve disc is thus varied and a flow rate of water and/or hot water which flows from the hot water supply path to the hot water egress path and the hot water filling path is regulated.

SUMMARY OF THE INVENTION

A flow rate regulation apparatus is required to be high in coaxiality of a valve shaft. When the valve shaft is made of a metal material, the valve shaft can be formed by cutting. High dimension accuracy tends to be achieved with cutting. Therefore, the valve shaft made of a metal material can meet the requirement for high coaxiality.

When the valve shaft is made of a resin, however, the valve shaft is formed by pouring a resin into a mold. With a method of pouring a resin into a mold, it is more difficult to achieve high dimension accuracy than with cutting. Therefore, when the valve shaft is made of a resin, it is difficult to meet the requirement for high coaxiality.

The present invention was made in view of the problems of the conventional technique as above. More specifically, the present invention provides a flow rate regulation apparatus capable of achieving improved coaxiality of a valve shaft made of a resin and a hot water apparatus.

A flow rate regulation apparatus according to one manner of the present invention includes a main body portion including an incoming water flow path, a collar portion arranged in the main body portion and provided with a first through hole along a direction of extension of the incoming water flow path, and a valve shaft made of a resin, the valve shaft being inserted in the first through hole. The valve shaft includes a first large-diameter portion, a second large-diameter portion, and a first small-diameter portion lying between the first large-diameter portion and the second large-diameter portion and being smaller in outer diameter than the first large-diameter portion and the second large-diameter portion.

According to the flow rate regulation apparatus in one manner of the present invention, coaxiality of the valve shaft made of a resin can be improved.

In the flow rate regulation apparatus, the valve shaft may further include a tapered portion arranged between the first large-diameter portion or the second large-diameter portion and the first small-diameter portion, and the outer diameter in the tapered portion may increase from a side of the first small-diameter portion toward the first large-diameter portion or the second large-diameter portion. In the flow rate regulation apparatus, the second large-diameter portion and the first small-diameter portion may be arranged as being in contact with each other.

When the valve shaft includes the tapered portion, production of a height difference in a surface defined as being outermost in the valve shaft can be suppressed. When the second large-diameter portion and the first small-diameter portion are arranged as being in contact with each other, the number of molds used for manufacturing the valve shaft can be reduced and manufacturing cost can be reduced.

In the flow rate regulation apparatus, the valve shaft may further include a third large-diameter portion and a second small-diameter portion lying between the second large-diameter portion and the third large-diameter portion and being smaller in outer diameter than the third large-diameter portion and the second large-diameter portion. In this case, coaxiality of the valve shaft can more finely be adjusted.

In the flow rate regulation apparatus, the valve shaft may include a first portion which slides with respect to an inner circumferential surface of the first through hole, and the first portion may include the first large-diameter portion, the second large-diameter portion, and the first small-diameter portion. In this case, coaxiality in the first portion is improved so that the valve shaft can more reliably be guided by the first through hole.

In the flow rate regulation apparatus, the main body portion may further include a guide portion arranged in the incoming water flow path and provided with a second through hole in which the valve shaft is inserted along the direction of extension of the incoming water flow path. In the flow rate regulation apparatus, the valve shaft may further include a second portion which slides with respect to an inner circumferential surface of the second through hole, and the second portion may include a fourth large-diameter portion, a fifth large-diameter portion, and a third small-diameter portion lying between the fourth large-diameter portion and the fifth large-diameter portion and being smaller in outer diameter than the fourth large-diameter portion and the fifth large-diameter portion. In this case, the valve shaft can more reliably be guided by the guide portion.

A flow rate regulation apparatus according to another manner of the present invention includes a main body portion including an incoming water flow path, a collar portion arranged in the main body portion and provided with a first through hole along a direction of extension of the incoming water flow path, and a valve shaft made of a resin, the valve shaft being inserted in the first through hole and including a first end, the first end being an end on a side of the incoming water flow path. The main body portion further includes a guide portion arranged in the incoming water flow path and provided with a second through hole in which the valve shaft is inserted along the direction of extension of the incoming water flow path. The valve shaft includes a first portion which slides with respect to an inner circumferential surface of the first through hole, a second portion which slides with respect to an inner circumferential surface of the second through hole, and a tip end portion arranged on a side of the first end relative to the second portion. The first portion includes a first large-diameter portion, a second large-diameter portion, and a first small-diameter portion lying between the first large-diameter portion and the second large-diameter portion and being smaller in outer diameter than the first large-diameter portion and the second large-diameter portion. An outer diameter at the tip end portion is smaller than a maximum value of an outer diameter in the second portion.

According to the flow rate regulation apparatus in another manner of the present invention, coaxiality at the tip end portion does not have to be adjusted and manufacturing cost can be reduced.

The flow rate regulation apparatus may further include a filling member attached to the valve shaft. The valve shaft may include a first portion which slides with respect to an inner circumferential surface of the first through hole. The first portion may include the first large-diameter portion, the second large-diameter portion, and the first small-diameter portion. The filling member may be attached on an outer circumferential surface of the valve shaft located in the first small-diameter portion. At least a part of the filling member may be located outside the collar portion when the valve shaft comes closer to the incoming water flow path.

According to the flow rate regulation apparatus in one manner of the present invention, coaxiality of the valve shaft made of a resin can be improved. According to the flow rate regulation apparatus in one manner of the present invention, water passage noise and erosion of a pipe can be suppressed.

In the flow rate regulation apparatus, the filling member may be more flexible than the valve shaft. In the flow rate regulation apparatus, the filling member may be made of rubber. In this case, attachment of the filling member to the valve shaft is facilitated.

In the flow rate regulation apparatus, an outer diameter of the filling member may be at least 0.99 and at most 1.01 time as large as the outer diameter of the first large-diameter portion and the second large-diameter portion. In this case, interference with sliding of the valve shaft and the inner circumferential surface of the through hole with respect to each other which is caused by the filling member can be suppressed while water passage noise and erosion of a pipe are suppressed.

In the flow rate regulation apparatus, an outer circumferential surface of the filling member may be flush with the outer circumferential surface of the valve shaft located in the first large-diameter portion and the second large-diameter portion. In this case, interference with sliding of the valve shaft and the inner circumferential surface of the through hole with respect to each other which is caused by the filling member can be suppressed while water passage noise and erosion of a pipe are suppressed.

A hot water apparatus according to one manner of the present invention includes the flow rate regulation apparatus described above, a hot water supply flow path, and a hot water feed flow path. The main body portion of the flow rate regulation apparatus further includes a first outgoing water flow path branched from the incoming water flow path and connected to the hot water supply path and a second outgoing water flow path branched from the incoming water flow path and connected to the hot water feed flow path.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
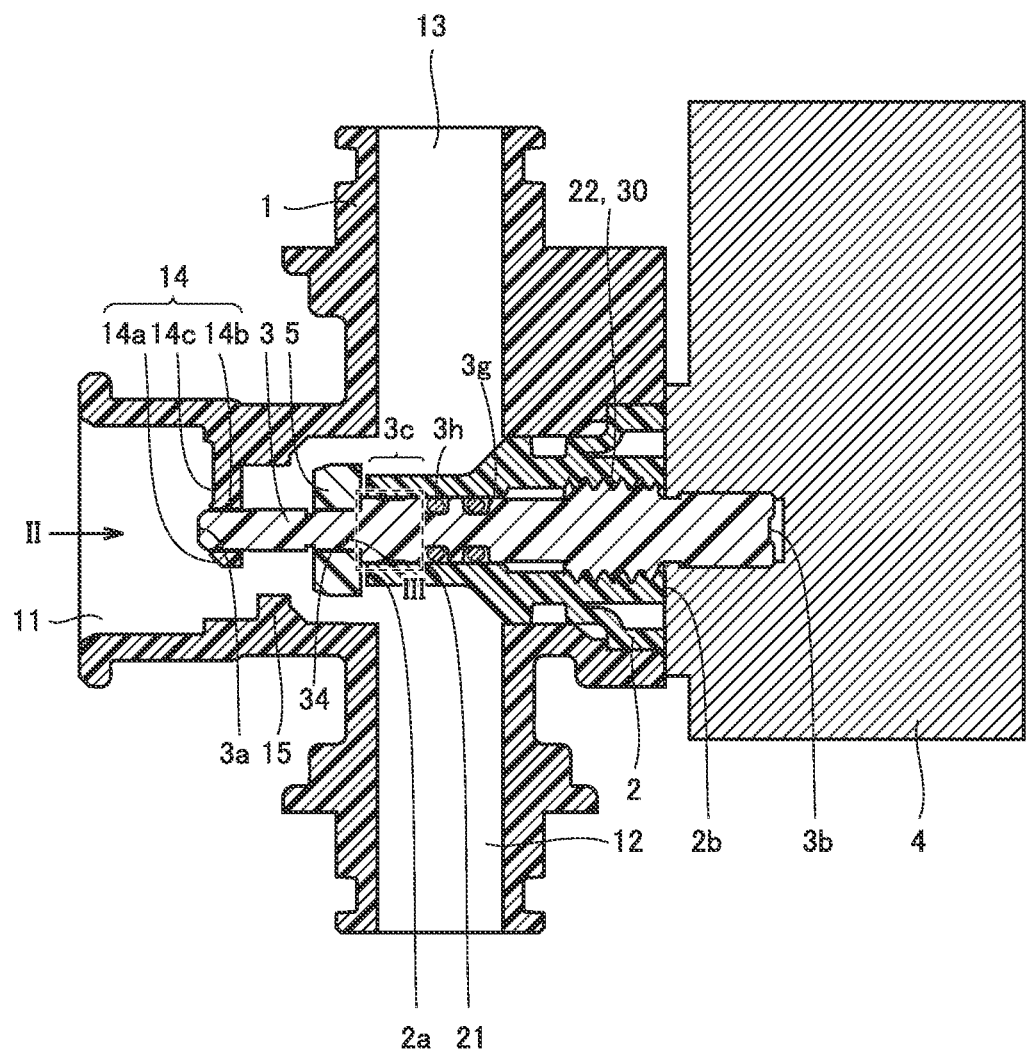
FIG. 1 is a cross-sectional view of a flow rate regulation apparatus according to a first embodiment.

Construction of Flow Rate Regulation Apparatus According to First Embodiment

A construction of a flow rate regulation apparatus according to a first embodiment will be described below with reference to FIGS. 1 to 7. In the figures, the same or corresponding elements have the same reference characters allotted. At least a part of the first embodiment described below may arbitrarily be combined. Relation of such a dimension as a length, a width, a thickness, or a depth is modified as appropriate for clarity of the drawings and does not represent actual dimensional relation.

As shown in FIG. 1, the flow rate regulation apparatus according to the first embodiment includes a main body portion 1, a collar portion 2, a valve shaft 3, a drive portion 4, and a valve disc 5. The flow rate regulation apparatus according to the first embodiment further includes a filling member 34. Main body portion 1 includes an incoming water flow path 11, a first outgoing water flow path 12, and a second outgoing water flow path 13.

Incoming water flow path 11, first outgoing water flow path 12, and second outgoing water flow path 13 are provided in main body portion 1. First outgoing water flow path 12 and second outgoing water flow path 13 are branched from incoming water flow path 11 in main body portion 1. Incoming water flow path 11 is a flow path through which water and/or hot water flowing into the flow rate regulation apparatus according to the first embodiment flows. First outgoing water flow path 12 and second outgoing water flow path 13 are flow paths through which water and/or hot water flowing out of the flow rate regulation apparatus according to the first embodiment flows.

Figure 2:
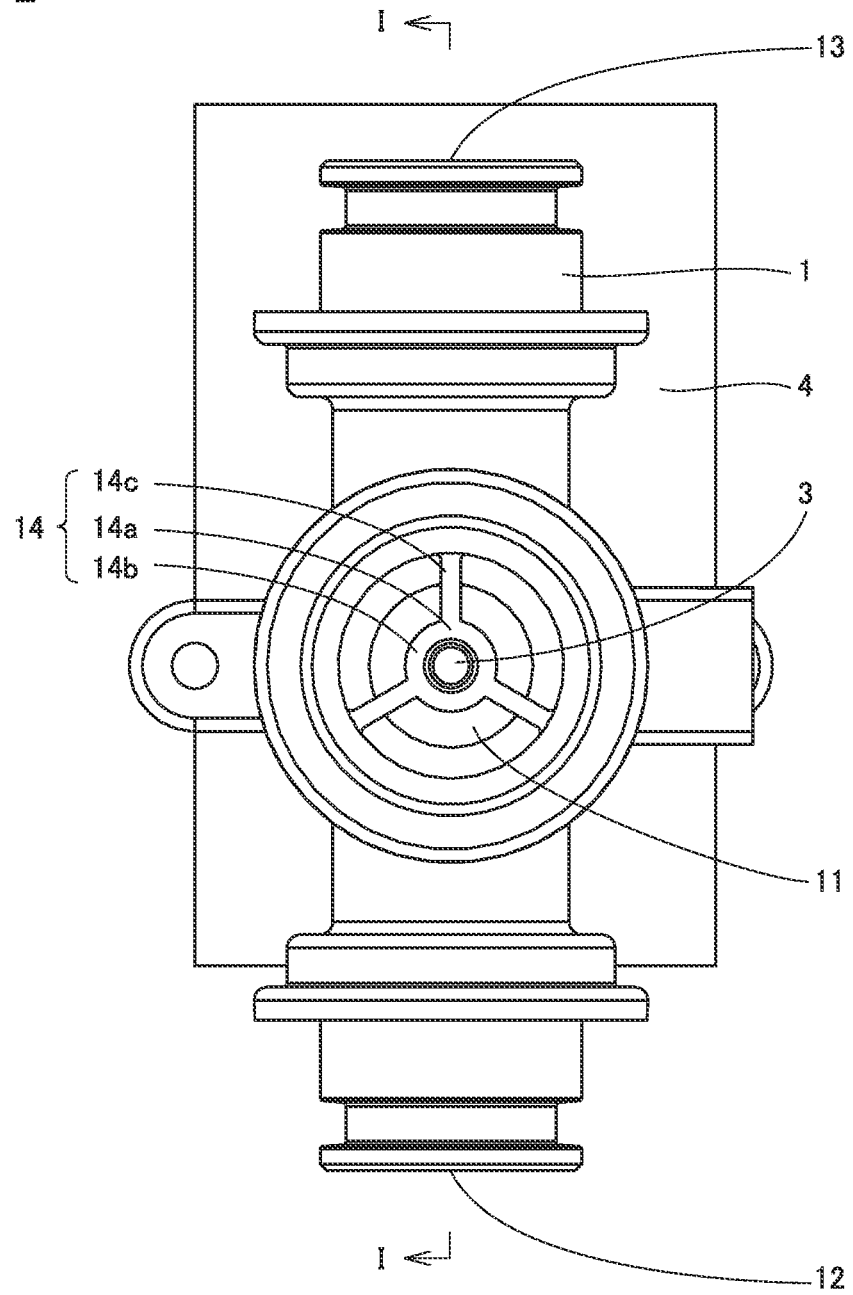
FIG. 2 is an enlarged plan view of an incoming water flow path in the flow rate regulation apparatus according to the first embodiment when viewed in a direction II in FIG. 1.

Main body portion 1 further includes a guide portion 14. Guide portion 14 is provided in incoming water flow path 11. As shown in FIG. 2, guide portion 14 includes a guide main body 14a, a second through hole 14b, and a rib 14c.

Guide main body 14a is arranged in incoming water flow path 11. Guide main body 14a is, for example, cylindrical. From a different point of view, guide main body 14a is provided with second through hole 14b. Second through hole 14b is provided along a direction of extension of incoming water flow path 11. Valve shaft 3 is inserted in second through hole 14b. Valve shaft 3 is guided by second through hole 14b.

Guide main body 14a is arranged in incoming water flow path 11 by means of rib 14c. Rib 14c couples an inner circumferential surface of incoming water flow path 11 and an outer circumferential surface of guide main body 14a to each other. Rib 14c extends in a direction from the inner circumferential surface of incoming water flow path 11 toward a center of incoming water flow path 11.

Main body portion 1 further includes a valve seat 15. Valve seat 15 is provided on the inner circumferential surface of incoming water flow path 11. Valve seat 15 is arranged at a position opposed to valve disc 5. More specifically, valve seat 15 extends in a direction from the inner circumferential surface of incoming water flow path 11 toward the center of incoming water flow path 11. Valve seat 15 is arranged downstream from guide portion 14 in a direction of passage of water and/or hot water.

Collar portion 2 is arranged in main body portion 1. Collar portion 2 includes a first end 2a and a second end 2b. Collar portion 2 is arranged such that first end 2a faces incoming water flow path 11. Second end 2b is opposite to first end 2a. Collar portion 2 is arranged such that second end 2b faces drive portion 4. A direction from first end 2a toward second end 2b extends along the direction of extension of incoming water flow path 11.

Collar portion 2 is provided with a first through hole 21. First through hole 21 extends from first end 2a toward second end 2b and passes through collar portion 2. From a different point of view, first through hole 21 is provided along the direction of extension of incoming water flow path 11. A thread 22 is formed on an inner circumferential surface of first through hole 21. A portion of first through hole 21 having thread 22 formed is located on a side of second end 2b.

Valve shaft 3 is formed of a resin. For example, polyphenylene sulfide (PPS) represents a resin used for valve shaft 3. Valve shaft 3 includes a first end 3a and a second end 3b. Second end 3b is opposite to first end 3a. A direction from first end 3a toward second end 3b may hereinafter be referred to as a direction of a central axis of valve shaft 3.

Valve shaft 3 is inserted in first through hole 21. Valve shaft 3 is inserted in second through hole 14b. Valve shaft 3 is inserted in first through hole 21 and second through hole 14b such that first end 3a faces incoming water flow path 11. Valve shaft 3 is attached to drive portion 4 at second end 3b. A thread 30 is formed on an outer circumferential surface of valve shaft 3 on a side of second end 3b. Thread 30 is engaged with thread 22.

Figure 3:
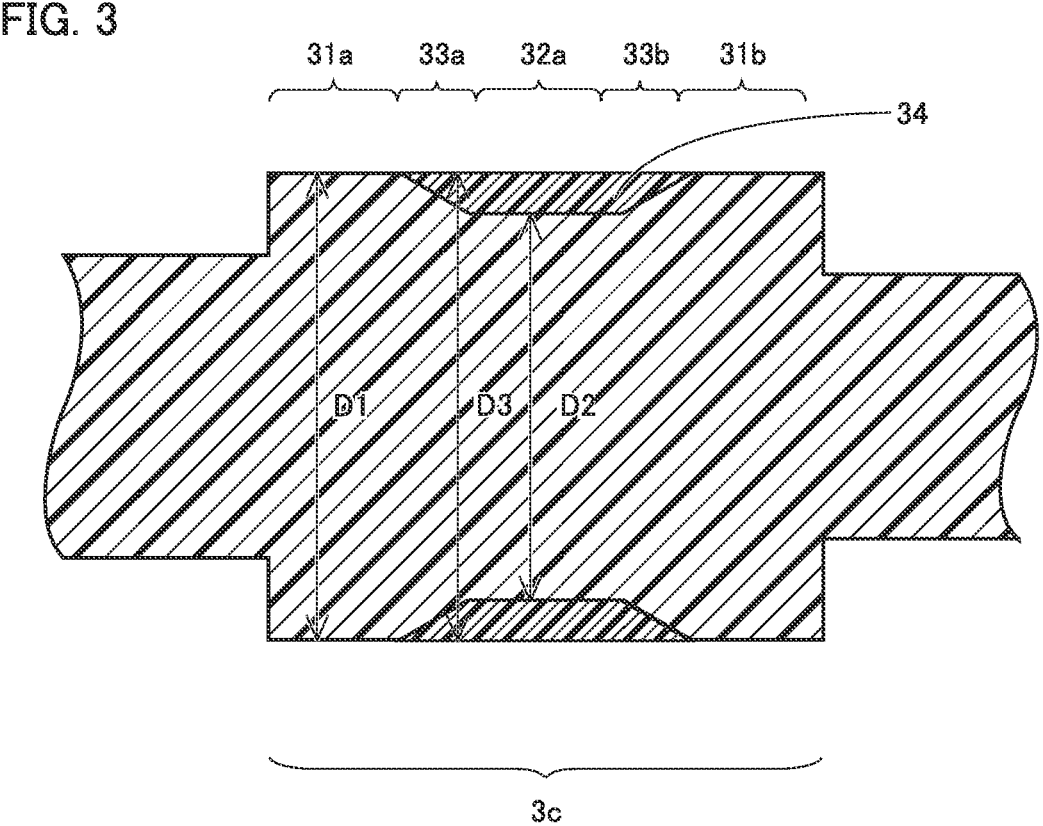
FIG. 3 is an enlarged view of a region III in FIG. 1.

Valve shaft 3 includes a first portion 3c. First portion 3c is a portion of valve shaft 3 which slides with respect to the inner circumferential surface of first through hole 21. As shown in FIG. 3, first portion 3c includes a large-diameter portion 31a (a first large-diameter portion), a large-diameter portion 31b (a second large-diameter portion), and a small-diameter portion 32a. Small-diameter portion 32a lies between large-diameter portion 31a and large-diameter portion 31b in the direction of the central axis. Small-diameter portion 32a is arranged between large-diameter portion 31a and large-diameter portion 31b in the direction of the central axis.

Valve shaft 3 has an outer diameter D1 in large-diameter portion 31a and large-diameter portion 31b. Valve shaft 3 has an outer diameter D2 in small-diameter portion 32a. Outer diameter D1 is greater than outer diameter D2.

Figure 4:
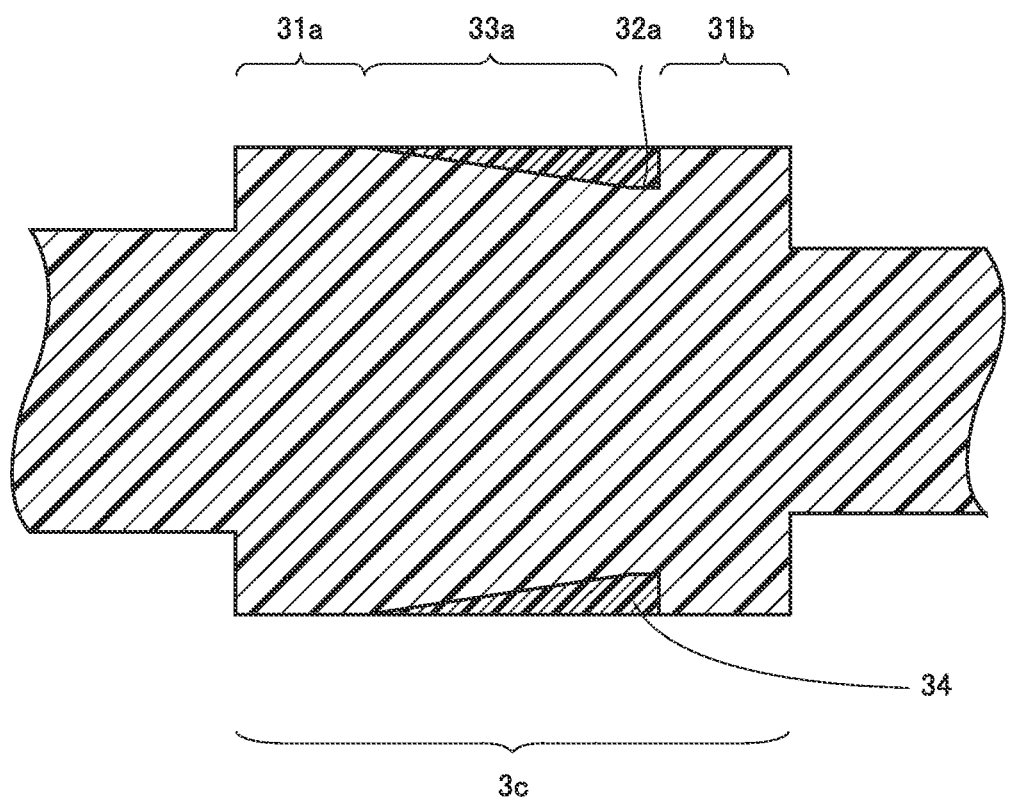
FIG. 4 is a partially enlarged cross-sectional view of a valve shaft 3 in the flow rate regulation apparatus according to a first modification of the first embodiment.

Valve shaft 3 may further include a tapered portion 33a and a tapered portion 33b. Tapered portion 33a is arranged between large-diameter portion 31a and small-diameter portion 32a. Tapered portion 33b is arranged between large-diameter portion 31b and small-diameter portion 32a. As shown in FIG. 4, only tapered portion 33a may be provided and tapered portion 33b does not have to be provided. Namely, large-diameter portion 31b and small-diameter portion 32a may be arranged as being in contact with each other. Though not shown, only tapered portion 33b may be provided and tapered portion 33a does not have to be provided. Namely, large-diameter portion 31a is arranged as being in contact with small-diameter portion 32a and tapered portion 33b may be arranged between small-diameter portion 32a and large-diameter portion 31b.

The outer diameter of valve shaft 3 in tapered portion 33a increases from a side of small-diameter portion 32a toward large-diameter portion 31a. The outer diameter of valve shaft 3 in tapered portion 33a located at an end on the side of small-diameter portion 32a is equal to outer diameter D2. The outer diameter of valve shaft 3 in tapered portion 33a located at an end on the side of large-diameter portion 31a is equal to outer diameter D1. The outer diameter of valve shaft 3 in tapered portion 33b increases from the side of small-diameter portion 32a toward large-diameter portion 31b. The outer diameter of valve shaft 3 in tapered portion 33b located at an end on the side of small-diameter portion 32a is equal to outer diameter D2. The outer diameter of valve shaft 3 in tapered portion 33b located at an end on the side of large-diameter portion 31b is equal to outer diameter D1.

Figure 5:
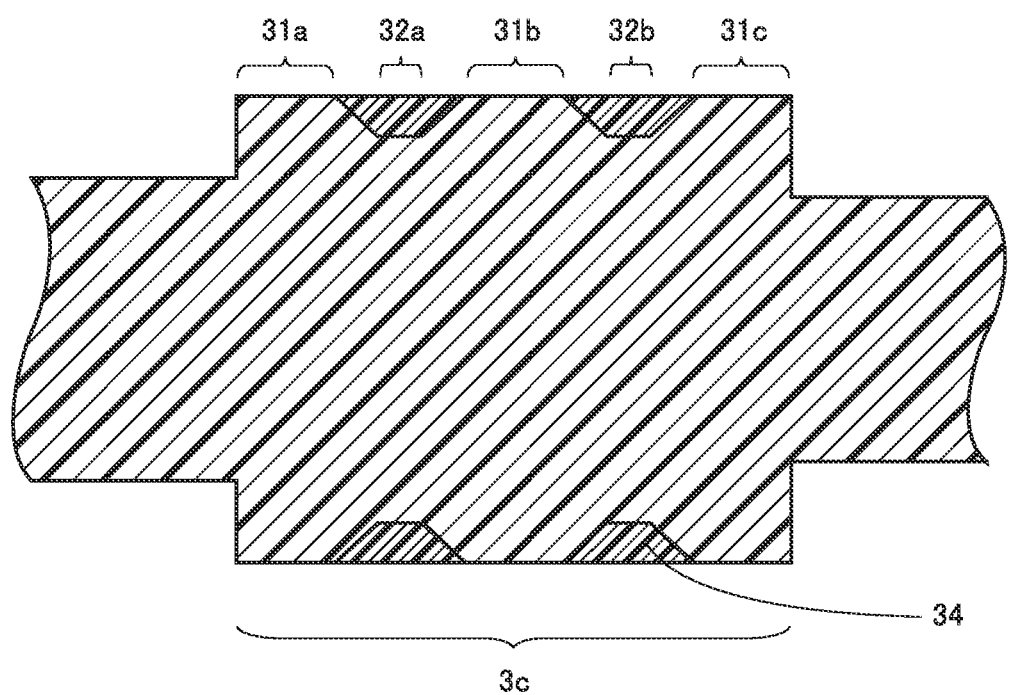
FIG. 5 is a partially enlarged cross-sectional view of valve shaft 3 in the flow rate regulation apparatus according to a second modification of the first embodiment.

As shown in FIG. 5, first portion 3c may further include a large-diameter portion 31c (a third large-diameter portion) and a small-diameter portion 32b (a second small-diameter portion). Valve shaft 3 may include a plurality of small-diameter portions.

As shown in FIG. 1, valve shaft 3 is provided with an O ring groove 3g. A plurality of O ring grooves 3g may be arranged. An O ring 3h is arranged in O ring groove 3g. O ring 3h ensures water-tightness between valve shaft 3 and the inner circumferential surface of first through hole 21. First portion 3c does not include O ring groove 3g.

Drive portion 4 moves valve shaft 3 along the direction of the central axis. For example, a stepping motor is employed as drive portion 4. More specifically, drive portion 4 rotates valve shaft 3 around the central axis of valve shaft 3. As set forth above, first through hole 21 has thread 22 and valve shaft 3 has thread 30 engaged with thread 22. Therefore, as drive portion 4 rotates valve shaft 3 around the central axis, valve shaft 3 moves along the central axis.

Movement of valve shaft 3 in a direction in which collar portion 2 is more exposed on the side of first end 2a may be referred to as movement forward and movement of valve shaft 3 in a direction in which collar portion 2 is less exposed on the side of first end 2a may be referred to as movement rearward.

As set forth above, valve shaft 3 includes first portion 3c which slides with respect to the inner circumferential surface of first through hole 21. Therefore, movement of valve shaft 3 along the direction of the central axis is guided by first through hole 21.

Valve disc 5 is attached to valve shaft 3. Specifically, valve disc 5 includes a hole. Valve disc 5 is attached to valve shaft 3 by inserting valve shaft 3 into the hole. Valve disc 5 is attached to valve shaft 3 as being opposed to valve seat 15. Valve disc 5 is attached so as to narrow a flow path between valve disc 5 and valve seat 15 as a result of movement forward of valve shaft 3 by drive portion 4.

While the flow path between valve disc 5 and valve seat 15 is narrowed, water and/or hot water does not substantially pass from the side of incoming water flow path 11 toward first outgoing water flow path 12 and second outgoing water flow path 13. A state that the flow path between valve disc 5 and valve seat 15 is narrowed and water and/or hot water does not substantially pass from the side of incoming water flow path 11 toward first outgoing water flow path 12 and second outgoing water flow path 13 may be referred to as a closed state below.

As valve shaft 3 is moved rearward from the closed state, a distance between valve disc 5 and valve seat 15 increases. As the distance between valve disc 5 and valve seat 15 increases, a flow rate of water and/or hot water which flows from the side of incoming water flow path 11 toward first outgoing water flow path 12 and second outgoing water flow path 13 increases.

Thus, in the flow rate regulation apparatus according to the first embodiment, drive portion 4 adjusts a position of valve disc 5 attached to valve shaft 3 to thereby vary a distance between valve disc 5 and valve seat 15, so that a flow rate of water and/or hot water which flows from the side of incoming water flow path 11 toward first outgoing water flow path 12 and second outgoing water flow path 13 is regulated.

Filling member 34 is attached to valve shaft 3. Filling member 34 is arranged on the outer circumferential surface of valve shaft 3 located between large-diameter portion 31*a* and large-diameter portion 31*b*. More specifically, filling member 34 is arranged on the outer circumferential surface of valve shaft 3 located in small-diameter portion 32*a*. When first portion 3*c* includes tapered portion 33*a* and tapered portion 33*b*, filling member 34 is arranged also on the outer circumferential surface of valve shaft 3 located in tapered portion 33*a* and tapered portion 33*b*. When first portion 3*c* further includes large-diameter portion 31*c* and small-diameter portion 32*b*, filling member 34 is arranged also on the outer circumferential surface of valve shaft 3 located between large-diameter portion 31*b* and large-diameter portion 31*c* (that is, filling member 34 is arranged also on the outer circumferential surface of valve shaft 3 located in small-diameter portion 32*b*).

Filling member 34 is preferably more flexible than valve shaft 3. From a different point of view, filling member 34 is preferably composed of a material lower in elasticity than a resin forming valve shaft 3. Filling member 34 is preferably made of rubber.

Filling member 34 has an outer diameter D3. Outer diameter D3 is greater than outer diameter D2. Outer diameter D3 is preferably at least 0.99 and at most 1.01 time as large as outer diameter D1. Outer diameter D3 is further preferably equal to outer diameter D1. An outer circumferential surface of filling member 34 is further preferably flush with the outer circumferential surface of valve shaft 3 located in large-diameter portion 31*a* and large-diameter portion 31*b*.

Figure 6:
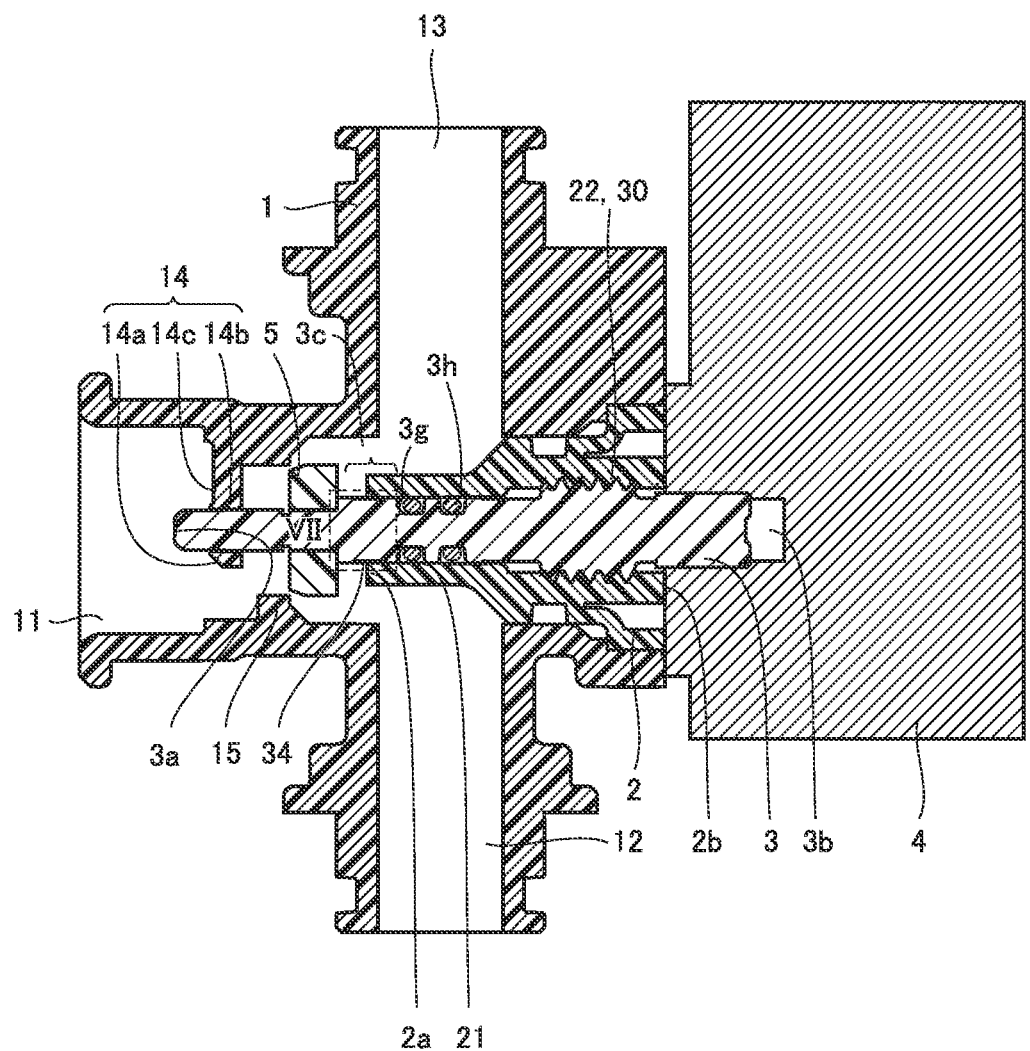
FIG. 6 is a cross-sectional view of the flow rate regulation apparatus according to the first embodiment when valve shaft 3 moves forward.
Figure 7:
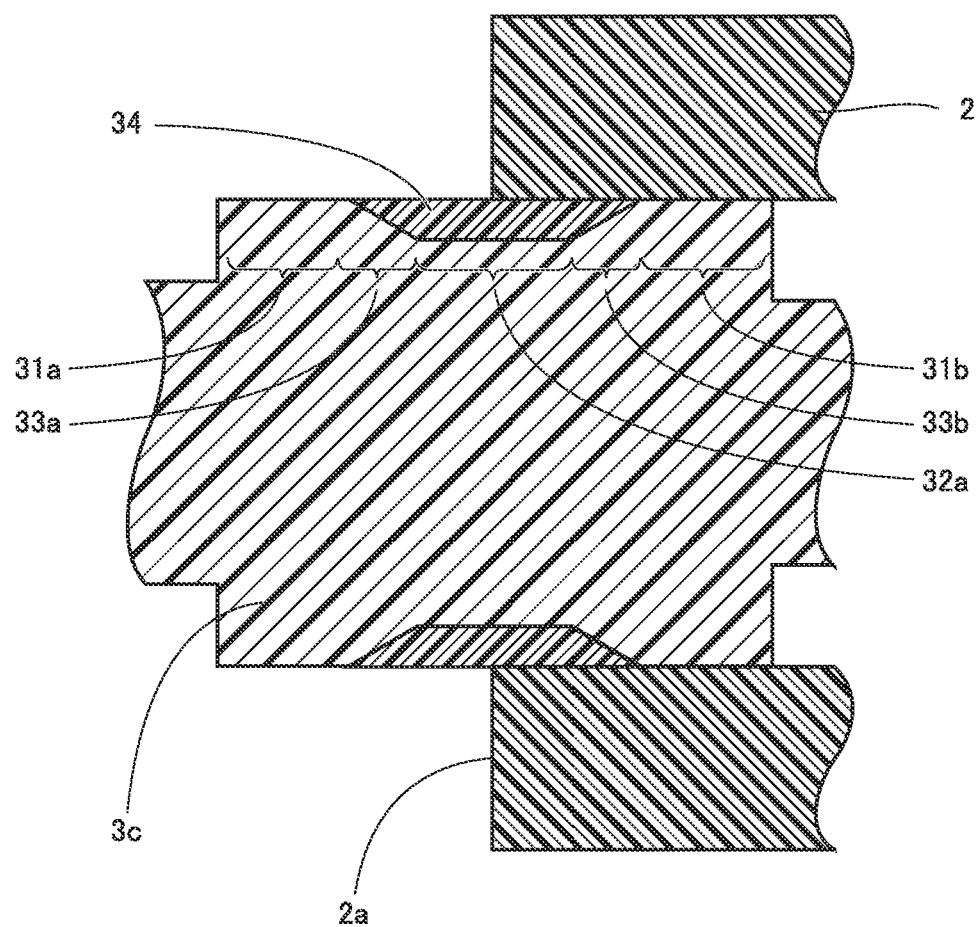
FIG. 7 is an enlarged view of a region VII in FIG. 6.

As shown in FIGS. 6 and 7, at least a part of filling member 34 is located outside collar portion 2 when valve shaft 3 moves forward. At least a part of filling member 34 is exposed at first end 2*a* of collar portion 2 when valve shaft 3 moves forward.

Though not shown, filling member 34 may be provided with a cut. The cut is provided, for example, along a radial direction of filling member 34. Filling member 34 is attached to valve shaft 3, for example, by pushing the cut to open and passing valve shaft 3 into filling member 34 through the cut. Filling member 34 can also be formed by baking.

Figure 8:
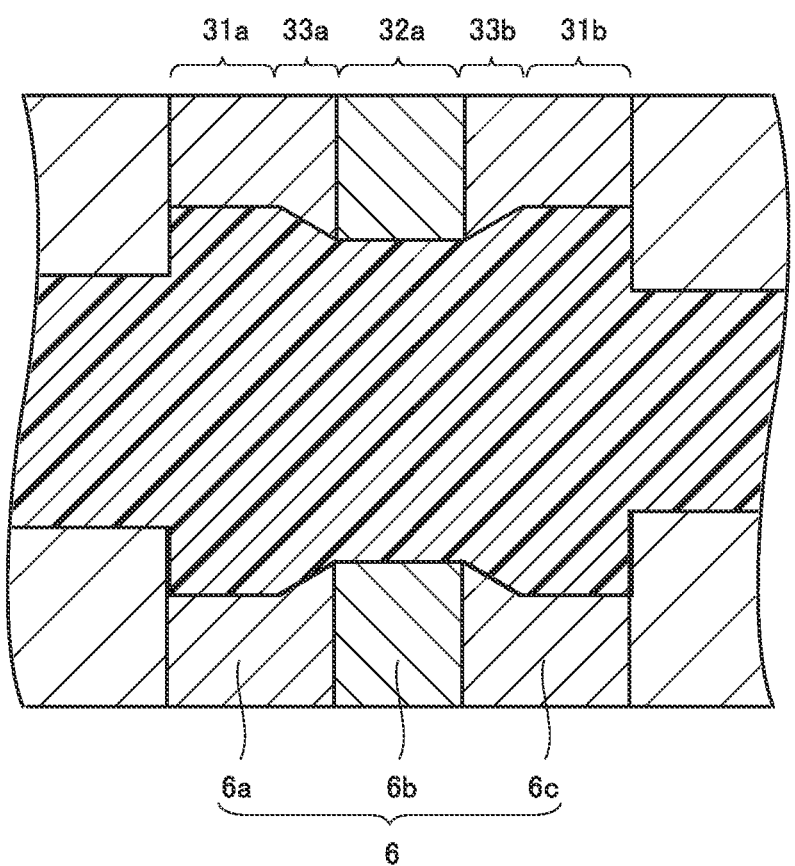
FIG. 8 is a cross-sectional view showing a method of manufacturing a valve shaft of the flow rate regulation apparatus according to the first embodiment.

A method of manufacturing valve shaft 3 of the flow rate regulation apparatus according to the first embodiment will be described below with reference to FIG. 8. Valve shaft 3 is formed by pouring a resin for forming valve shaft 3 in a mold 6 and curing the resin. An inner wall surface of mold 6 is shaped in conformity with valve shaft 3.

Mold 6 is divided into a plurality of parts. A position of each of the parts of divided mold 6 can be adjusted relatively to one another. For example, as shown in FIG. 8, mold 6 is divided into a first portion 6*a*, a second portion 6*b*, and a third portion 6*c* for forming portions including large-diameter portion 31*a*, large-diameter portion 31*b*, small-diameter portion 32*a*, tapered portion 33*a*, and tapered portion 33*b* of valve shaft 3.

First portion 6*a* is a portion for forming large-diameter portion 31*a* and tapered portion 33*a*. Second portion 6*b* is a portion for forming small-diameter portion 32*a*. Third portion 6*c* is a portion for forming large-diameter portion 31*b* and tapered portion 33*b*.

An effect of the flow rate regulation apparatus according to the first embodiment will be described below. When valve shaft 3 does not include large-diameter portion 31*a*, large-diameter portion 31*b*, and small-diameter portion 32*a*, a portion of valve shaft 3 constant in outer diameter extends longer in the direction of the central axis. Valve shaft 3 may warp owing to residual stress applied to the outer circumferential surface of valve shaft 3 in molding valve shaft 3. Such warpage is greater as the portion of valve shaft 3 constant in outer diameter is longer. Consequently, when valve shaft 3 does not include large-diameter portion 31*a*, large-diameter portion 31*b*, and small-diameter portion 32*a*, it is difficult to obtain required coaxiality.

When valve shaft 3 includes large-diameter portion 31*a*, large-diameter portion 31*b*, and small-diameter portion 32*a* on the other hand, valve shaft 3 has a smaller outer diameter in small-diameter portion 32*a* so that residual stress applied to the outer circumferential surface of valve shaft 3 in molding valve shaft 3 tends to be released in small-diameter portion 32*a*. Residual stress applied to the outer circumferential surface of large-diameter portion 31*a* is less likely to propagate to large-diameter portion 31*b*. Consequently, even though valve shaft 3 is formed of a resin, valve shaft 3 is less likely to warp.

Whether or not coaxiality of valve shaft 3 satisfies a required numeric value is determined by measuring coaxiality at a measurement point on the outer circumferential surface of valve shaft 3. When the result of measurement at the measurement point does not satisfy required coaxiality, the mold corresponding to a portion of valve shaft 3 including the measurement point is modified.

In valve shaft 3 of the flow rate regulation apparatus according to the first embodiment, small-diameter portion 32*a* smaller in outer diameter than large-diameter portion 31*a* and large-diameter portion 31*b* is arranged between large-diameter portion 31*a* and large-diameter portion 31*b*. Therefore, even when the mold is adjusted for one of large-diameter portion 31*a* and large-diameter portion 31*b*, influence by the adjustment is less likely to affect the other of large-diameter portion 31*a* and large-diameter portion 31*b*. In valve shaft 3 of the flow rate regulation apparatus according to the first embodiment, coaxiality of large-diameter portion 31*a* and coaxiality of large-diameter portion 31*b* tend to be adjusted independently of each other.

Thus, valve shaft 3 of the flow rate regulation apparatus according to the first embodiment is less likely to warp even though it is made of a resin and coaxiality is readily adjusted. Therefore, coaxiality can be improved. Consequently, according to the flow rate regulation apparatus in the first embodiment, valve shaft 3 can more reliably be guided by first through hole 21.

If filling member 34 is not attached to valve shaft 3, a space is provided between the outer circumferential surface of valve shaft 3 located in small-diameter portion 32a and the inner circumferential surface of first through hole 21. As valve shaft 3 moves forward and consequently the space is connected to the outside of collar portion 2, water and/or hot water from incoming water flow path 11 may flow into the space.

Water and/or hot water which flows in the space is relatively lower in pressure than water and/or hot water which flows in the surroundings. Therefore, air bubbles are created in water and/or hot water which passes through the space. When the air bubbles are introduced into water and/or hot water which flows through first outgoing water flow path 12 and second outgoing water flow path 13, the air bubbles disappear as being compressed by a relatively high pressure of water and/or hot water which flows through first outgoing water flow path 12 and second outgoing water flow path 13. Disappearance of the air bubbles brings about impact. Therefore, the air bubbles turn out to be a cause of water passage noise. When the air bubbles disappear in the vicinity of a wall surface of a pipe, it may be a cause of erosion of the wall surface of the pipe.

With filling member 34 being attached to valve shaft 3 on the other hand, a space between the outer circumferential surface of valve shaft 3 located in small-diameter portion 32a and the inner circumferential surface of first through hole 21 is smaller. Therefore, water and/or hot water from incoming water flow path 11 is less likely to flow into the space. Therefore, according to the flow rate regulation apparatus in the first embodiment, water passage noise and erosion of a pipe can be suppressed.

When valve shaft 3 further includes tapered portion 33a and tapered portion 33b in the flow rate regulation apparatus according to the first embodiment, the outer diameter does not abruptly change between large-diameter portion 31a and large-diameter portion 31b, and small-diameter portion 32a. Therefore, in this case, production of a height difference in the outer circumferential surface of valve shaft 3 is less likely when coaxiality of valve shaft 3 is improved by adjusting a mold.

When valve shaft 3 includes only any one of tapered portion 33a and tapered portion 33b in the flow rate regulation apparatus according to the first embodiment, the number of molds in molding valve shaft 3 can be decreased. Therefore, in this case, cost for manufacturing valve shaft 3 can be reduced.

When valve shaft 3 further includes large-diameter portion 31c and small-diameter portion 32b in the flow rate regulation apparatus according to the first embodiment, valve shaft 3 can more finely coaxially be adjusted.

When filling member 34 is composed of a material more flexible than the resin forming valve shaft 3 such as rubber in the flow rate regulation apparatus according to the first embodiment, filling member 34 can readily be attached to valve shaft 3 by deforming filling member 34. In this case, even when outer diameter D3 is greater than outer diameter D1, filling member 34 relatively readily deforms as a result of contact with the inner circumferential surface of first through hole 21 and filling member 34 is less likely to interfere with sliding of valve shaft 3 and first through hole 21 with respect to each other.

When outer diameter D3 is at least 0.99 time as large as outer diameter D1 in the flow rate regulation apparatus according to the first embodiment, the space between the outer circumferential surface of filling member 34 and the inner circumferential surface of first through hole 21 is smaller so that passage of water and/or hot water from incoming water flow path 11 into the space can be suppressed. When outer diameter D3 is at most 1.01 time as large as outer diameter D1, a difference between outer diameter D3 and outer diameter D1 can be accommodated by deformation of filling member 34 owing to contact with the inner circumferential surface of first through hole 21. Therefore, in this case, interference by filling member 34 with sliding of valve shaft 3 and the inner circumferential surface of first through hole 21 with respect to each other can be suppressed while water passage noise and erosion of a pipe are suppressed.

When the outer circumferential surface of filling member 34 and the outer circumferential surface of valve shaft 3 located in large-diameter portion 31a and large-diameter portion 31b are flush with each other in the flow rate regulation apparatus according to the first embodiment, interference by filling member 34 with sliding of valve shaft 3 and the inner circumferential surface of first through hole 21 with respect to each other can be suppressed while water passage noise and erosion of a pipe are suppressed.

Construction of Flow Rate Regulation Apparatus
According to Second Embodiment

A construction of the flow rate regulation apparatus according to a second embodiment will be described below with reference to FIGS. 9 and 10. A difference from the first embodiment will mainly be described below and similar description will not be repeated.

Figure 9:
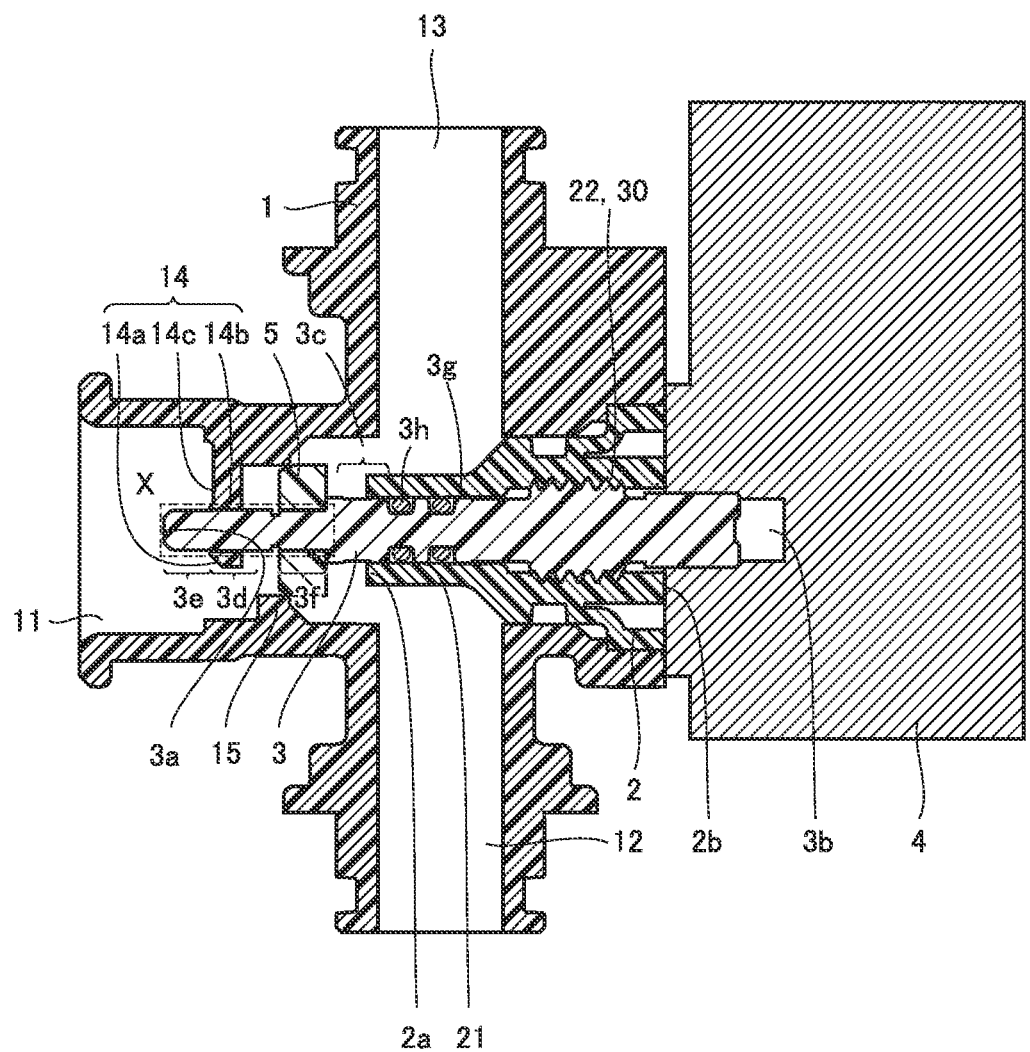
FIG. 9 is a cross-sectional view of the flow rate regulation apparatus according to a second embodiment.
Figure 10:
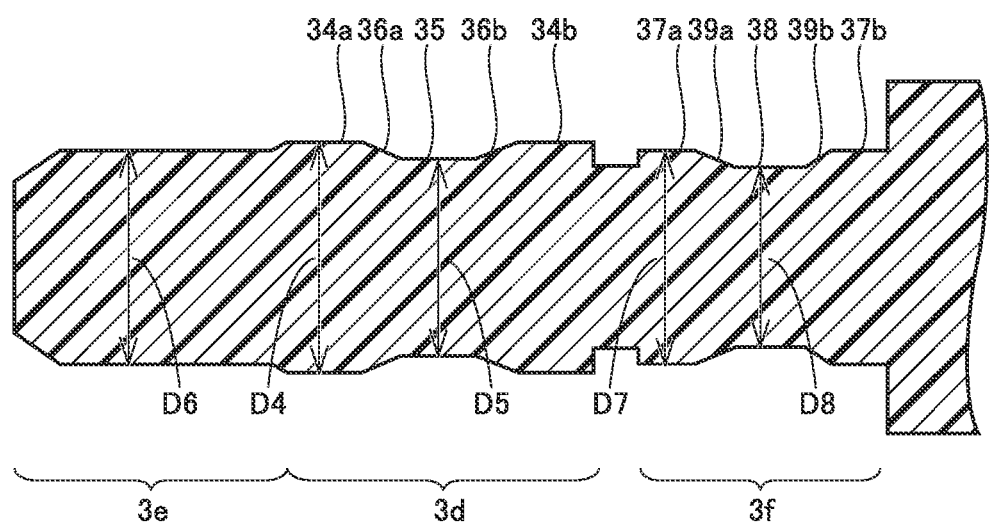
FIG. 10 is an enlarged view of a region X in FIG. 9.

As shown in FIG. 9, the flow rate regulation apparatus according to the second embodiment includes main body portion 1, collar portion 2, valve shaft 3, drive portion 4, and valve disc 5. Main body portion 1 includes incoming water flow path 11, first outgoing water flow path 12, second outgoing water flow path 13, guide portion 14, and valve seat 15. Valve shaft 3 includes first portion 3c. The flow rate regulation apparatus according to the second embodiment is similar in these aspects to the flow rate regulation apparatus according to the first embodiment.

In the flow rate regulation apparatus according to the second embodiment, valve shaft 3 includes a second portion 3d. In the flow rate regulation apparatus according to the second embodiment, valve shaft 3 may include a tip end portion 3e. In the flow rate regulation apparatus according to the second embodiment, valve shaft 3 may include a third portion 3f. The flow rate regulation apparatus according to the second embodiment is different in these aspects from the flow rate regulation apparatus according to the first embodiment.

Valve shaft 3 slides with respect to the inner circumferential surface of second through hole 14b in second portion 3d. As shown in FIG. 10, valve shaft 3 includes a large-diameter portion 34a (a fourth large-diameter portion), a large-diameter portion 34b (a fifth large-diameter portion), and a small-diameter portion 35 (a third small-diameter portion) in second portion 3d. Small-diameter portion 35 lies between large-diameter portion 34a and large-diameter portion 34b. An outer diameter D4 in large-diameter portion 34a and large-diameter portion 34b is greater than an outer diameter D5 in small-diameter portion 35.

Valve shaft 3 may include a tapered portion 36a and a tapered portion 36b in second portion 3d. Tapered portion 36a is arranged between large-diameter portion 34a and small-diameter portion 35. Tapered portion 36b is arranged between large-diameter portion 34b and small-diameter portion 35. One of tapered portion 36a and tapered portion 36b does not have to be provided.

The outer diameter of valve shaft 3 in tapered portion 36a increases from a side of small-diameter portion 35 toward large-diameter portion 34a. The outer diameter of valve shaft 3 in tapered portion 36b increases from a side of small-diameter portion 35 toward large-diameter portion 34b. The outer diameter of valve shaft 3 in tapered portion 36a and tapered portion 36b located at the ends on the side of small-diameter portion 35 is equal to outer diameter D5. The outer diameter of valve shaft 3 in tapered portion 36a located at an end on a side of large-diameter portion 34a and tapered portion 36b located on a side of large-diameter portion 34b is equal to outer diameter D4.

Tip end portion 3e is a portion of valve shaft 3 which protrudes from second through hole 14b when valve seat 15 and valve disc 5 are in the closed state. From a different point of view, tip end portion 3e is a portion of valve shaft 3 located on a side of first end 3a relative to second portion 3d. An outer diameter D6 at tip end portion 3e is smaller than outer diameter D4. Outer diameter D6 at tip end portion 3e is smaller than a maximum value of the outer diameter of valve shaft 3 in second portion 3d.

Third portion 3f is a portion of valve shaft 3 where valve disc 5 is attached. Third portion 3f includes a large-diameter portion 37a (a sixth large-diameter portion), a large-diameter portion 37b (a seventh large-diameter portion), and a small-diameter portion 38 (a fourth small-diameter portion). Small-diameter portion 38 lies between large-diameter portion 37a and large-diameter portion 37b. An outer diameter D7 in large-diameter portion 37a and large-diameter portion 37b is greater than an outer diameter D8 in small-diameter portion 38.

Third portion 3f may include a tapered portion 39a and a tapered portion 39b. Tapered portion 39a is arranged between large-diameter portion 37a and small-diameter portion 38. Tapered portion 39b is arranged between large-diameter portion 37b and small-diameter portion 38.

The outer diameter of valve shaft 3 in tapered portion 39a increases from a side of small-diameter portion 38 toward large-diameter portion 37a. The outer diameter of valve shaft 3 in tapered portion 39b increases from the side of small-diameter portion 38 toward large-diameter portion 37b. The outer diameter of valve shaft 3 in tapered portion 39a and tapered portion 39b located at ends on the side of small-diameter portion 38 is equal to outer diameter D8. The outer diameter of valve shaft 3 in tapered portion 39a located at an end on a side of large-diameter portion 37a and tapered portion 39b located on a side of large-diameter portion 37b is equal to outer diameter D7.

Effect of Flow Rate Regulation Apparatus According to Second Embodiment

An effect of the flow rate regulation apparatus according to the second embodiment will be described below. As set forth above, valve shaft 3 is guided as it is slid with respect to the inner circumferential surface of second through hole 14b in second portion 3d. When valve shaft 3 is low in coaxiality in second portion 3d, valve shaft 3 is not accurately guided by the inner circumferential surface of second through hole 14b.

Since second portion 3d includes large-diameter portion 34a, large-diameter portion 34b, and small-diameter portion 35 in the flow rate regulation apparatus according to the second embodiment, coaxiality of valve shaft 3 in second portion 3d can be improved. Therefore, according to the flow rate regulation apparatus in the second embodiment, valve shaft 3 can more reliably be guided by second through hole 14b.

Tip end portion 3e protrudes from second through hole 14b while valve disc 5 and valve seat 15 are in the closed state. Therefore, even when coaxiality at tip end portion 3e is low, it does not give rise to a problem in having valve shaft 3 guided more accurately by second through hole 14b. Coaxiality at a high level is not required at tip end portion 3e. Therefore, by setting outer diameter D6 at tip end portion 3e to be smaller than outer diameter D4 in large-diameter portion 34a and large-diameter portion 34b, need for adjustment of coaxiality at tip end portion 3e can be obviated.

When valve shaft 3 includes third portion 3f and third portion 3f includes large-diameter portion 37a, large-diameter portion 37b, and small-diameter portion 38 in the flow rate regulation apparatus according to the second embodiment, coaxiality of third portion 3f can be improved. Therefore, in this case, valve disc 5 can more reliably be attached to valve shaft 3.

Construction of Hot Water Apparatus According to Third Embodiment

Figure 11:
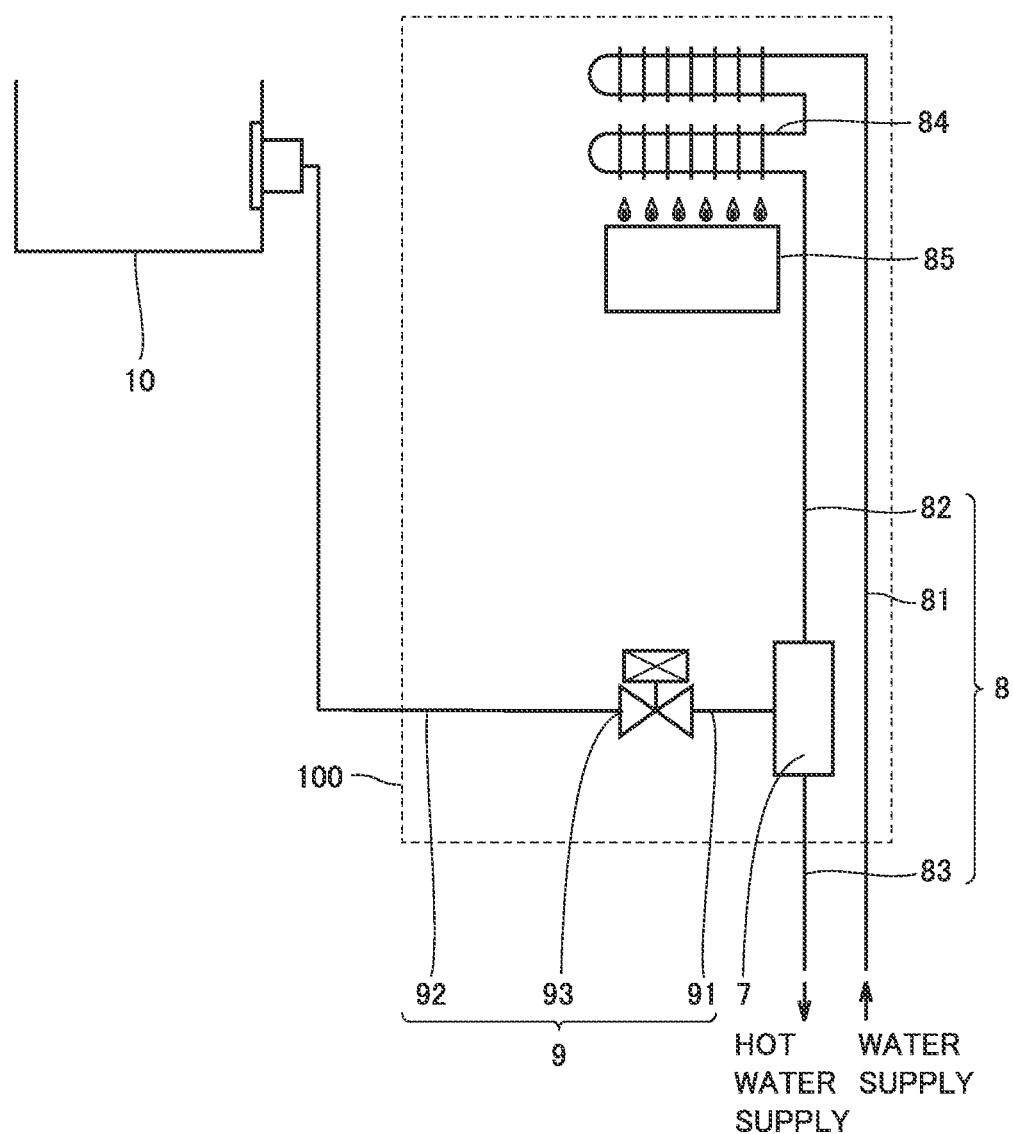
FIG. 11 is a schematic diagram of a hot water apparatus according to a third embodiment.

A construction of a hot water apparatus 100 according to a third embodiment will be described below with reference to FIG. 11. As shown in FIG. 11, hot water apparatus 100 according to the third embodiment includes a flow rate regulation apparatus 7, a hot water supply flow path 8, and a hot water feed flow path 9.

Flow rate regulation apparatus 7 is the flow rate regulation apparatus according to the embodiments above. Hot water supply flow path 8 is a flow path for supplying heated clean water to a tap. Hot water feed flow path 9 is a flow path for supplying heated clean water to a bathtub 10.

Hot water supply flow path 8 includes a pipe 81, a pipe 82, a pipe 83, and a heat exchanger 84. Pipe 81 has one end connected to water supply. Pipe 81 has the other end connected to one end of heat exchanger 84. Heat exchanger 84 has the other end connected to one end of pipe 82. Pipe 82 has the other end connected to incoming water flow path 11 of flow rate regulation apparatus 7. Pipe 83 has one end connected to first outgoing water flow path 12 of flow rate regulation apparatus 7.

A burner 85 is arranged in the vicinity of heat exchanger 84. Heat exchanger 84 heats clean water supplied through pipe 81 through heat exchange with a combustion gas emitted from burner 85. Heated clean water which flows through pipe 82 is supplied to a tap connected to the other end of pipe 83 through flow rate regulation apparatus 7 and pipe 83.

Hot water feed flow path 9 includes a pipe 91, a pipe 92, and a hot water feed electromagnetic valve 93. Pipe 91 has one end connected to second outgoing water flow path 13 of flow rate regulation apparatus 7. Pipe 91 has the other end connected to one end of hot water feed electromagnetic valve 93. Pipe 92 has one end connected to the other end of hot water feed electromagnetic valve 93. Pipe 92 has the other end connected to bathtub 10. Heated clean water which flows through pipe 82 is supplied to bathtub 10 through flow rate regulation apparatus 7, pipe 91, pipe 92, and hot water feed electromagnetic valve 93.

Though embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A flow rate regulation apparatus comprising:
   a main body portion including an incoming water flow path;
   a collar portion arranged in the main body portion and provided with a first through hole along a direction of extension of the incoming water flow path;
   a valve shaft made of a resin, the valve shaft being inserted in the first through hole;
   an O-ring; and
   a filling member made of a material having a lower elasticity than the resin,
   a groove being formed at an outer circumferential surface of the valve shaft,
   the O-ring being disposed only in the groove,
   the valve shaft including a first large-diameter portion, a second large-diameter portion, and a first small-diameter portion lying between the first large-diameter portion and the second large-diameter portion and being smaller in outer diameter than the first large-diameter portion and the second large-diameter portion, and
   the filling member being disposed on the outer circumferential surface located at the first small-diameter portion.

2. The flow rate regulation apparatus according to claim 1, wherein
   the valve shaft further includes a tapered portion arranged between the first large-diameter portion or the second large-diameter portion and the first small-diameter portion, and
   the outer diameter in the tapered portion increases from a side of the first small-diameter portion toward the first large-diameter portion or the second large-diameter portion.

3. The flow rate regulation apparatus according to claim 2, wherein
   the valve shaft is arranged with the second large-diameter portion and the first small-diameter portion being in contact with each other.

4. The flow rate regulation apparatus according to claim 1, wherein
   the valve shaft further includes a third large-diameter portion and a second small-diameter portion lying between the third large-diameter portion and the second large-diameter portion and being smaller in outer diameter than the third large-diameter portion and the second large-diameter portion.

5. The flow rate regulation apparatus according to claim 1, wherein
   the valve shaft includes a first portion which slides with respect to an inner circumferential surface of the first through hole, and
   the first portion includes the first large-diameter portion, the second large-diameter portion, and the first small-diameter portion.

6. The flow rate regulation apparatus according to claim 5, wherein
   the main body portion further includes a guide portion arranged in the incoming water flow path and provided with a second through hole in which the valve shaft is inserted along the direction of extension of the incoming water flow path,
   the valve shaft further includes a second portion which slides with respect to an inner circumferential surface of the second through hole, and
   the second portion includes a fourth large-diameter portion, a fifth large-diameter portion, and a third small-diameter portion lying between the fourth large-diameter portion and the fifth large-diameter portion and being smaller in outer diameter than the fourth large-diameter portion and the fifth large-diameter portion.

7. The flow rate regulation apparatus according to claim 1, the flow rate regulation apparatus further comprising a filling member attached to the valve shaft, wherein
   the valve shaft includes a first portion which slides with respect to an inner circumferential surface of the first through hole,
   the first portion includes the first large-diameter portion, the second large-diameter portion, and the first small-diameter portion,
   the filling member is attached on an outer circumferential surface of the valve shaft located in the first small-diameter portion, and
   at least a part of the filling member is located outside the collar portion when the valve shaft comes closer to the incoming water flow path.

8. The flow rate regulation apparatus according to claim 7, wherein
   the filling member is more flexible than the valve shaft.

9. The flow rate regulation apparatus according to claim 8, wherein
   the filling member is made of rubber.

10. The flow rate regulation apparatus according to claim 7, wherein
    an outer diameter of the filling member is at least 0.99 and at most 1.01 time as large as the outer diameter of the first large-diameter portion and the second large-diameter portion.

11. The flow rate regulation apparatus according to claim 7, wherein
    an outer circumferential surface of the filling member is flush with the outer circumferential surface of the valve shaft located in the first large-diameter portion and the second large-diameter portion.

12. A hot water apparatus comprising:
    the flow rate regulation apparatus according to claim 1;
    a hot water supply flow path; and
    a hot water feed flow path,
    the main body portion further including a first outgoing water flow path branched from the incoming water flow path and connected to the hot water supply flow path and a second outgoing water flow path branched from the incoming water flow path and connected to the hot water feed flow path.

* * * * *